United States Patent
Zhang et al.

(10) Patent No.: US 7,992,395 B2
(45) Date of Patent: Aug. 9, 2011

(54) EXPANSION VALVE WITH PIEZO MATERIAL

(75) Inventors: Ming Zhang, Ballwin, MO (US); Sesha C. Madireddi, St. Charles, MO (US); Byeongchul Na, Sate College, PA (US)

(73) Assignees: Hussmann Corporation, Bridgeton, MO (US); Omega Piezo Technologies, Inc., State College, PA (US)

( * ) Notice: Subject to any disclaimer, the term of this patent is extended or adjusted under 35 U.S.C. 154(b) by 1077 days.

(21) Appl. No.: 11/332,897

(22) Filed: Jan. 17, 2006

(65) Prior Publication Data

US 2007/0163297 A1  Jul. 19, 2007

(51) Int. Cl.
 F25B 1/00 (2006.01)
(52) U.S. Cl. .......................................... 62/115; 62/527
(58) Field of Classification Search .................. 62/527, 62/126, 129, 498, 223–225, 158, 227, 244, 62/238.3, 115; 137/554; 251/48
 See application file for complete search history.

(56) References Cited

U.S. PATENT DOCUMENTS

| 4,375,753 | A | * | 3/1983 | Imasu et al. ..................... 62/160 |
| 4,730,986 | A | * | 3/1988 | Kayukawa et al. ........ 417/222.2 |
| 5,740,969 | A | * | 4/1998 | Hoffmann et al. ......... 239/533.2 |
| 5,911,127 | A | * | 6/1999 | Tulpule ........................ 702/190 |
| 6,147,436 | A |   | 11/2000 | Claeyssen et al. |
| 6,578,373 | B1 | * | 6/2003 | Barbier ........................... 62/158 |
| 6,719,224 | B2 | * | 4/2004 | Enomoto et al. ........... 239/585.1 |
| 6,763,670 | B1 | * | 7/2004 | Bushnell et al. ............... 62/200 |
| 6,854,285 | B2 | * | 2/2005 | Jessen ............................. 62/225 |
| 6,856,073 | B2 |   | 2/2005 | Bryant et al. |
| 7,140,353 | B1 | * | 11/2006 | Rauznitz et al. ............. 123/446 |
| 2003/0016089 | A1 |   | 1/2003 | Cousy et al. |
| 2003/0159735 | A1 |   | 8/2003 | Barillot et al. |
| 2004/0140737 | A1 |   | 7/2004 | Barillot et al. |
| 2005/0056799 | A1 | * | 3/2005 | Malone ........................... 251/11 |

FOREIGN PATENT DOCUMENTS

| EP | 0 675 329 A1 * | 10/1995 |
| EP | 0 675329 A1 * | 10/1995 |
| JP | 60-65969 A * | 4/1985 |

* cited by examiner

*Primary Examiner* — Mohammad Ali
(74) *Attorney, Agent, or Firm* — Michael Best & Friedrich LLP

(57) ABSTRACT

A method and system of controlling the temperature of a refrigeration system. In an embodiment, an expansion valve for a refrigeration system comprises an entry portion, an exit portion, and a flow control portion including a piezo material. The entry portion is configured to allow refrigerant to flow into the expansion valve. The exit portion is configured to allow refrigerant to flow from the expansion valve. The flow control portion is disposed between the entry portion and the exit portion, and is configured to control a volume of refrigerant that passes through the expansion valve.

3 Claims, 7 Drawing Sheets

EXPANSION VALVE WITH PIEZO MATERIAL

FIELD

Embodiments of the invention relate to systems and methods of controlling temperature of a refrigeration system. More specifically, embodiments of the invention relate to an expansion valve for a refrigeration system.

BACKGROUND

Refrigeration systems are often employed to preserve foods and other goods while they are being transported or displayed. Additionally, some refrigeration systems, such as air conditioning systems, are used to control air temperature and humidity to provide a comfortable living environment. It is important to accurately control the temperature of such systems. Traditionally, refrigeration systems have primarily depended on three types of expansion valves for controlling system temperatures, pressures, and cooling capacity, including capillary tubes, thermostatic expansion valves ("TXVs"), and electronic expansion valves ("EXVs"). A capillary tube is cost effective; however, its temperature, pressure, and cooling capacity controlling ability is limited due to its fixed opening. Though also relatively inexpensive, a TXV may not necessarily be very accurate. Additionally, a TXV may not react very quickly to changing temperatures and conditions. Accordingly, EXVs have been adopted in the industry. EXVs use an electronically controlled step motor. EXVs are generally more accurate than TXVs, but are also more costly. As such, the use of EXVs is still not widespread.

SUMMARY

The following summary sets forth certain example embodiments of the invention described in greater detail below. It does not set forth all such embodiments and should in no way be construed as limiting of the invention.

In an embodiment, an expansion valve for a refrigeration system comprises an entry portion, an exit portion, and a flow control portion including a piezo material. The entry portion is configured to allow refrigerant to flow into the expansion valve. The exit portion is configured to allow refrigerant to flow from the expansion valve. The flow control portion is disposed between the entry portion and the exit portion, and is configured to control a volume, temperature, and pressure of refrigerant that passes through the expansion valve.

In another embodiment, a refrigeration system comprises an evaporating unit, a condensing unit, and a flow control unit that includes a piezo element. The evaporating unit is configured to vaporize refrigerant circulated through the refrigeration system. The condensing unit is configured to condense the refrigerant. The flow control unit is disposed between the condensing unit and the evaporating unit, and is configured to at least partially control a flow of refrigerant between the condensing unit and the evaporating unit.

In yet another embodiment, a method of controlling flow of a liquid in a refrigeration system comprises maintaining the liquid at a first pressure in a first zone of the refrigeration system; maintaining the liquid at a second pressure in a second zone of the refrigeration system; and controlling, with a piezo material, a flow of the liquid from the first zone to the second zone. The second pressure is relatively lower than the first pressure.

In still another embodiment, a method of upgrading a refrigeration system comprises removing at least one existing expansion valve from the refrigeration system, and replacing the removed valve with a second expansion valve including a piezo element. The second expansion valve is configured to control refrigerant flow in the refrigeration system.

Other aspects of the invention will become apparent by consideration of the detailed description and accompanying drawings.

DETAILED DESCRIPTION

Figure 1:
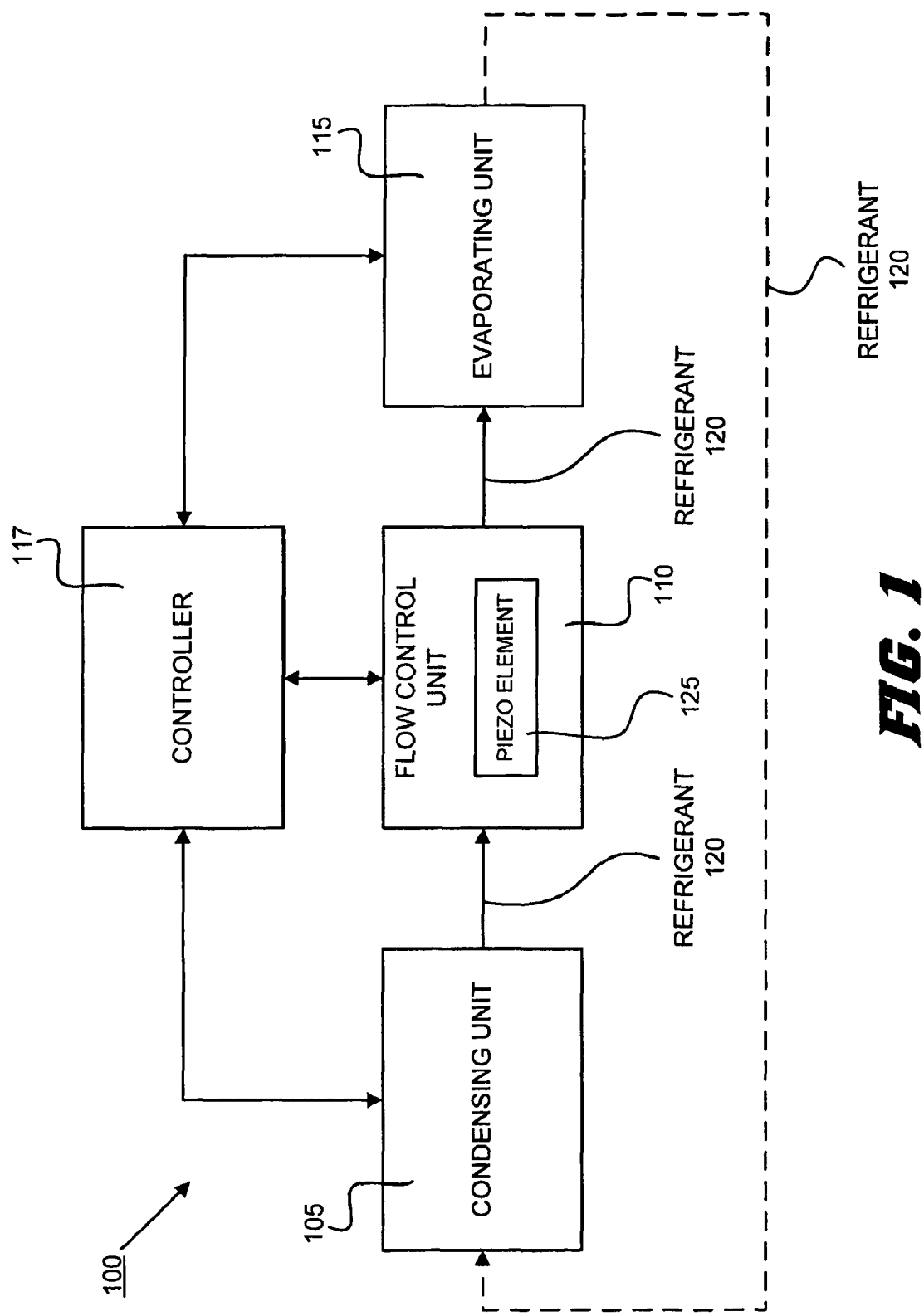
FIG. 1 illustrates an embodiment of a refrigeration system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected" and "coupled" and variations thereof are used broadly and encompass both direct and indirect connections and couplings. Further, "connected" and "coupled" are not restricted to physical or mechanical connections or couplings.

Embodiments of the invention relate to systems and methods of controlling the cooling effects produced by a refrigeration system. In an embodiment, a flow control unit is disposed between a condensing unit and an evaporating unit, and used to control the flow of refrigerant therebetween. The flow control unit includes a piezoelectric material that deforms when a voltage is applied, and, therefore, can be used to change the rate of flow of refrigerant between the condensing unit and the evaporating unit, thereby controlling the overall cooling effect of the refrigeration system. Embodiments disclosed herein can provide accurate temperature control at a relatively low cost.

Generally, the primary components of a refrigeration system include one or more compressors, condensers, expansion valves, and evaporators. An expansion valve can control a condensation pressure, a condensation temperature, an evaporation pressure, an evaporation pressure, and/or a refrigerant flow rate of a refrigeration system. Such control allows an expansion valve to alter the cooling capacity and cooling speed for cooling applications. Flow control can involve controlling condensation, evaporation, and/or refrigerant flow characteristics of a refrigeration system.

In one exemplary system, refrigerant gas is condensed in a condenser, and transferred from the condenser to an evaporator through an expansion valve. The condenser and evaporator comprise a plurality of coils, or small tubes, that allow the refrigerant to dissipate or absorb heat. For example, the coils of the condenser may aid the refrigerant to dissipate heat, while the coils of the evaporator may aid the refrigerant to absorb heat. The condenser and evaporator may include other components to aid in the dissipation or absorption of heat. For example, the condenser can include a cooling fan. The expansion valve is coupled between the coils of the condenser and evaporator, and used to regulate the flow of refrigerant from the condenser to the evaporator. A cooling effect is created when the liquid refrigerant evaporates inside of the evaporator coils after flowing from the relatively higher pressure condenser to the relatively lower pressure evaporator.

FIG. 1 illustrates a refrigeration system 100 that includes a condensing unit 105, a flow control unit 110, an evaporating unit 115, and a controller 117. The term "unit" is intended to incorporate the mechanical and electrical components needed to effectively carry out the functions of the defined unit. For example, a condensing unit may include a compressor and heat exchanging coils. Refrigerant 120 flows from the condensing unit 105 to the evaporating unit 115 through the flow control unit 110. In some embodiments, the refrigerant 120 is returned to the condensing unit 105 after flowing through the evaporating unit 115. A piezo element (e.g., a piezoelectric element) 125 is included in the flow control unit 110, and is at least partially responsible for controlling the volume of refrigerant 120 that flows through the flow control unit 110. It should be understood that the refrigeration system 100 is a basic system that is used as an example only. In other embodiments, the refrigeration system 100 may include multiple other components (e.g., a compressor) or stages.

In some embodiments, the controller 117 is configured to control operation of the condensing unit 105, the flow control unit 110, and/or the evaporating unit 115. The controller 117 may be a processor that executes computer executable programs with the aid of an operating system (not illustrated). In other embodiments, the controller may comprise hardware, such that functions described herein are performed by hardware components. For example, the controller 117 may be implemented by an application-specific integrated circuit (ASIC), firmware, dedicated components, or the like, as are known in the art. Thus, it will be appreciated that the controller may be implemented in an entirely hardware embodiment, or an embodiment combining software and hardware. Additionally, the controller 117 may be a stand-alone module that performs the functions required by the refrigeration system 100. Alternatively, the controller 117 may be incorporated into another control system that is used to control one or more other systems.

Referring still to FIG. 1, the condensing unit 105 and evaporating unit 115 can maintain a first pressure zone and a second pressure zone, respectively. The first pressure zone is maintained at a relatively higher pressure than the second pressure zone. Accordingly, refrigerant 120 can flow from the higher pressure zone to the lower pressure zone, creating a cooling effect.

The flow control unit 110 is used to control the volume of refrigerant 120 that flows from the first zone to the second zone. When the piezo element 125 is deformed (e.g., by applying a voltage), varying amounts of refrigerant 120 are allowed to flow from the condensing unit 105 to the evaporating unit 115. The piezo-based flow control unit 110 can be implemented in refrigeration systems that are used for a variety of applications. For example, the flow control unit 110 can be implemented in commercial coolers that are commonly used for supermarket display cases, such as the Hussmann D5 or M5 refrigerated display cases. Additionally, the flow control unit 110 can be implemented in residential or commercial refrigerators, or in refrigeration systems for trucks, such as the Thermo King SB refrigerated trailer. In other embodiments, the flow control unit 110 can be implemented in commercial and residential air conditioning or heat pump systems, as well as automotive air conditioning systems. Other applications of the flow control unit 110 or refrigeration system 100 should be recognized by those skilled in the art, without departing from the spirit and scope of the invention.

Figure 2:
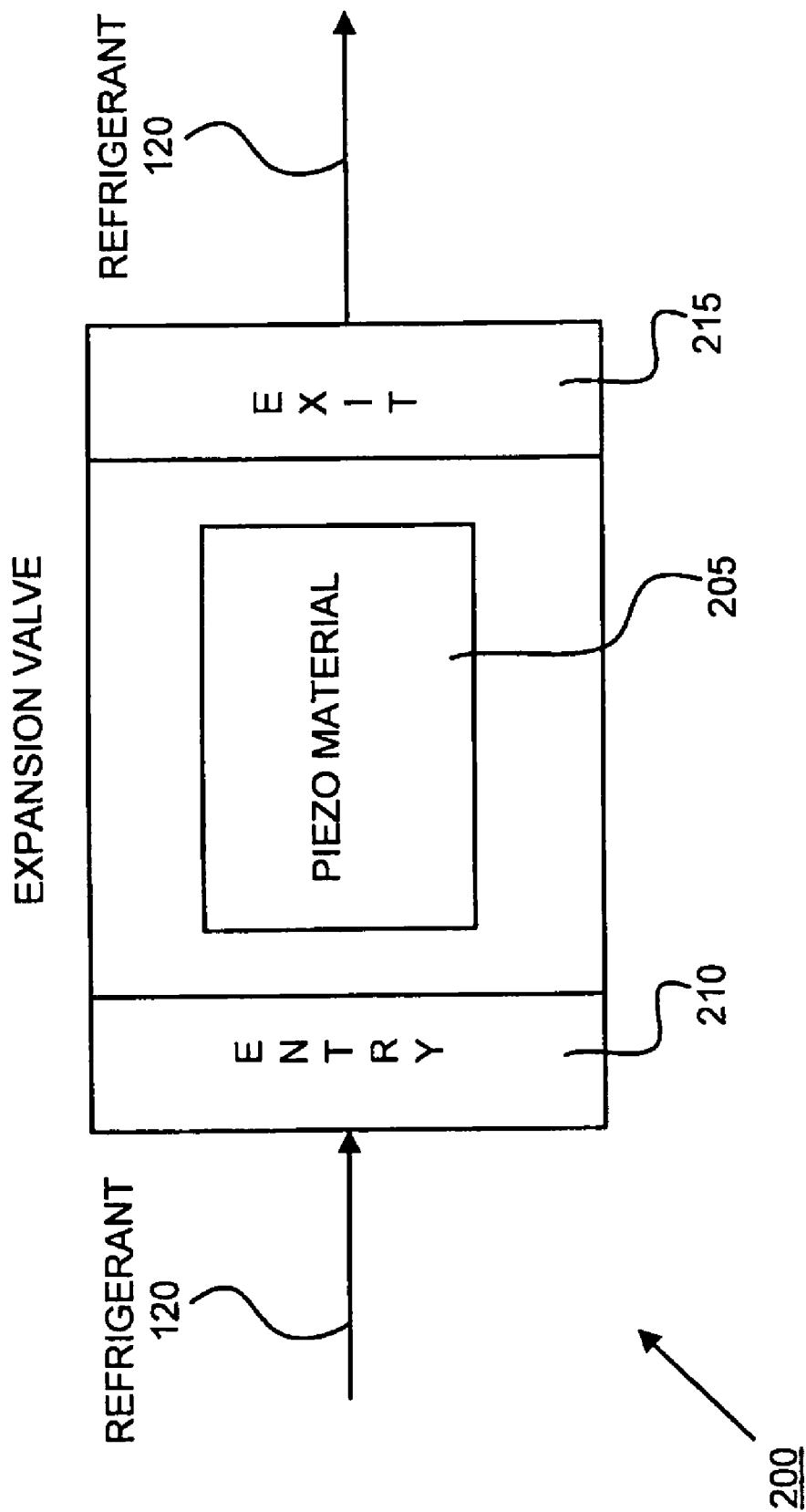
FIG. 2 illustrates an embodiment of an expansion valve that includes a piezo material.

The flow control unit 110 is implemented as, or includes, an expansion valve 200, as shown in FIG. 2. The expansion valve 200 includes a piezo material 205 that is disposed between an entry portion 210, and an exit portion 215. In some embodiments, the piezo material 205 is a piezoceramic material. Alternatively, the piezo material 205 is a single crystal piezo material, such as quartz. Refrigerant 120 flows from the entry portion 210 to the exit portion 215, the volume of which is at least partially controlled by the piezo material 205. The position and size of the piezo material 205 may vary depending on the configuration of the refrigeration system 100. Additionally, the piezo material 205 may be positioned in various locations within the expansion valve 200, such as, for example, proximate to the entry portion 210, proximate to the exit portion 215, or approximately equidistant from the entry portion 210 and the exit portion 215.

The direct current ("DC") voltage that is applied to the piezo material 205 may also vary. In some embodiments, the amount of refrigerant that flows through the expansion valve 200 is controlled by the voltage that is applied to the piezo material 205. For example, in one embodiment, the amount of refrigerant that flows through the expansion valve 200 increases as the voltage applied to the piezo material increases. Conversely, the amount of refrigerant that is allowed to flow through the expansion valve 200 may decrease as the voltage applied to the piezo material 205 increases. Alternatively or additionally, the piezo material 205 can react to other forces. Embodiments of expansion valves reflecting various voltage/refrigerant flow relationships are shown and described in FIGS. 4-6. The amount of voltage that needs to be applied to the piezo material 205 to achieve a desired deformation may depend on the piezo material's size, shape, position, composition, etc. In some embodiments, the controller 117 is capable of supplying the voltage to the piezo material 205. Alternatively, the controller 117 can transmit a control signal to a separate module, such as a power source module (not shown), which can then apply a variable voltage to the piezo material 205. In such embodiments, the power source module may be used to convert an alternating current ("AC") voltage to a DC voltage.

Figure 3:
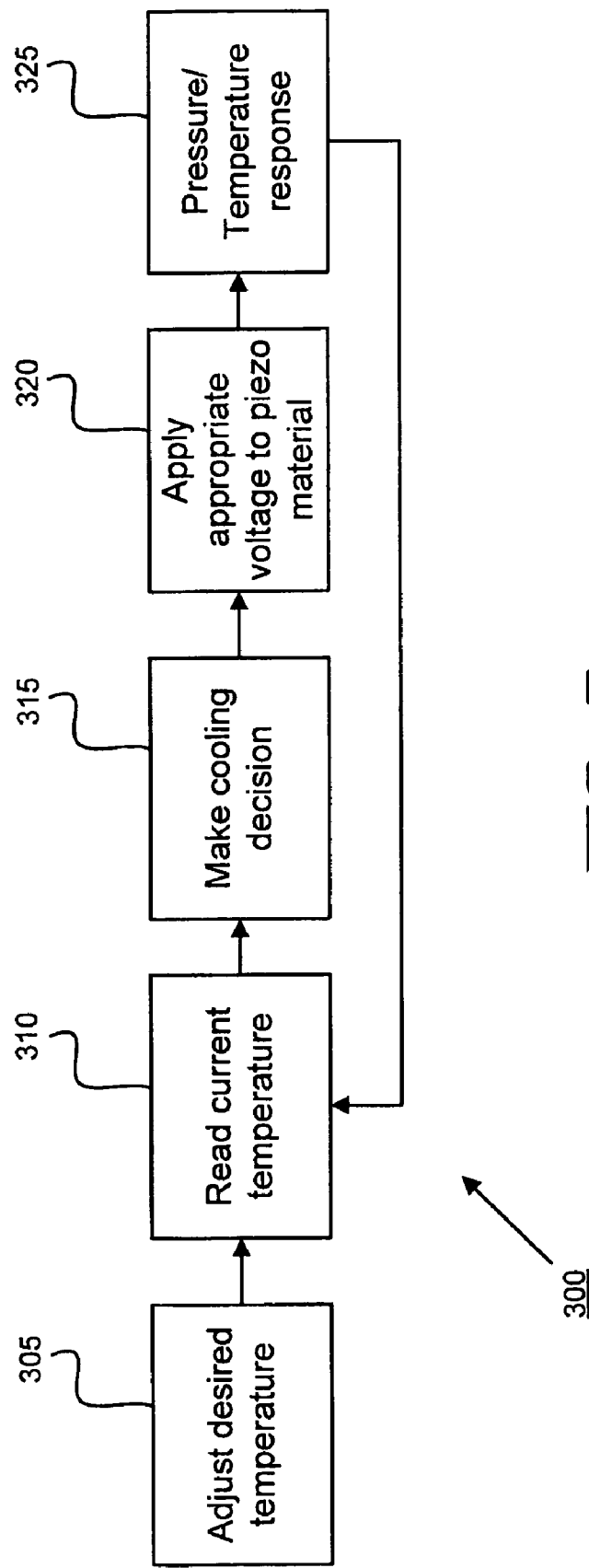
FIG. 3 illustrates a process of controlling a refrigeration system temperature.

FIG. 3 shows an exemplary process 300 that can be used to manipulate the piezo material 205, thereby controlling the volume of refrigerant flow and thus the temperature of the refrigeration system 100. The process 300 begins by adjusting the desired temperature (step 305). The desired temperature may vary depending on the application of the refrigeration system 100. For example, the desired temperature of a display case in a supermarket may be the temperature at which spoilage of the contents is avoided. The way in which the desired temperature is adjusted may vary according to the refrigeration system 100. For instance, the temperature of a display case may be adjusted using a remote temperature adjustment mechanism (not shown) (e.g., a rotatable temperature dial). Such a mechanism can then provide a desired temperature input to the controller 117. Alternatively or additionally, the temperature may be adjusted directly at the controller 117 in a manual or automatic manner.

After a desired temperature is chosen, the controller 117 can initialize a temperature adjustment loop. The temperature adjustment loop begins with reading the current temperature of the environment that is being cooled (step 310). The type and number of temperature measuring devices that are used may vary depending on the refrigeration system 100. For example, in one embodiment, multiple temperature probes are used to measure the temperature of a refrigeration truck trailer that is cooled by a refrigeration unit. In another embodiment, a thermostat is used to measure the temperature of a room that is cooled by a refrigeration unit (e.g., an AC unit). The temperature measuring device(s) can transmit, to the controller 117, an actual temperature signal, or a plurality of actual temperature signals that are indicative of the measured temperature. The controller 117 can then utilize those signals to make a cooling decision (step 315). The cooling decision can include various factors. For example, the controller 117 can evaluate whether the temperature needs to be increased, decreased, or maintained. The controller 117 can also evaluate the rate at which the temperature is to be changed. Conditions that require a substantial cooling change (e.g., more than 10 to 15 degrees) may require a faster cooling rate than conditions that require only a minimal cooling change (e.g., a few degrees of adjustment). Furthermore, the rate at which the temperature change is achieved over a given period of time may vary. For example, a cooling change may be constant (i.e., linear) throughout the cooling change, or non-linear, having a fast cooling rate initially, and then slowing near the desired temperature. Such cooling decisions can be accomplished using software or hardware components of the controller 117, as previously described.

Figure 4:
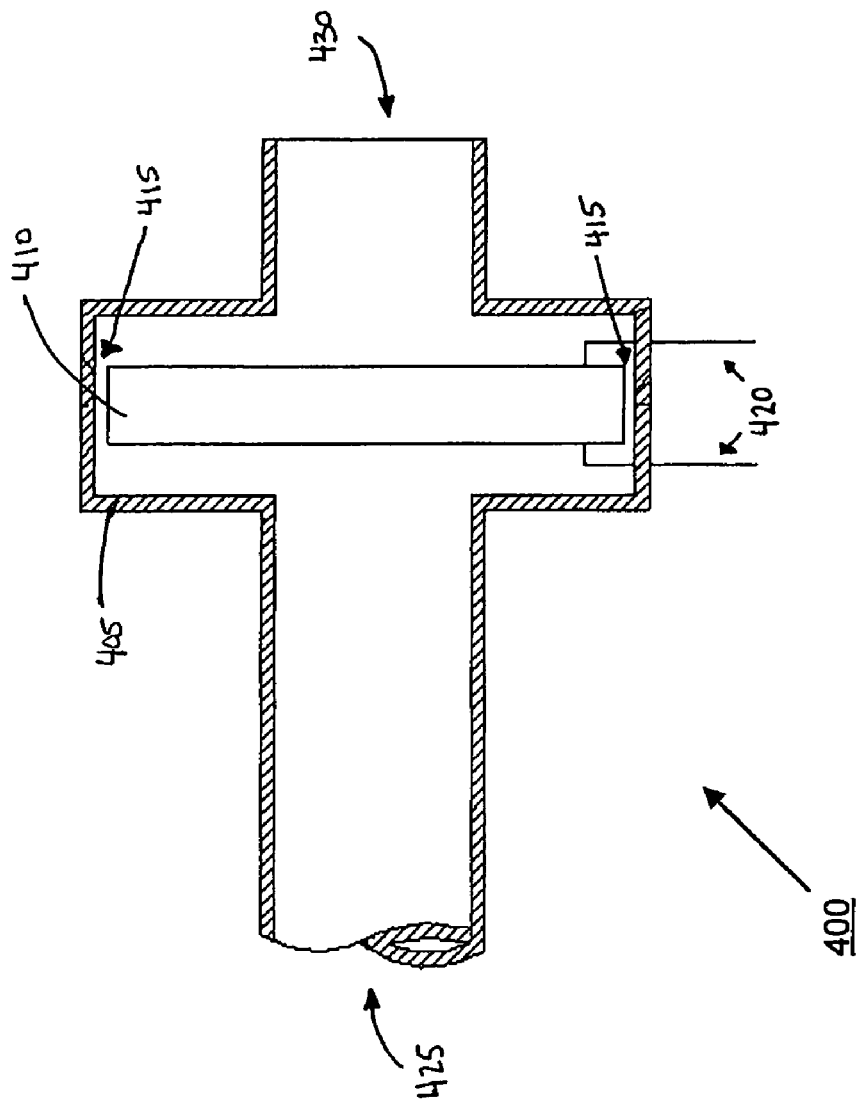
FIG. 4 illustrates another embodiment of an expansion valve that includes a piezo material.
Figure 5:
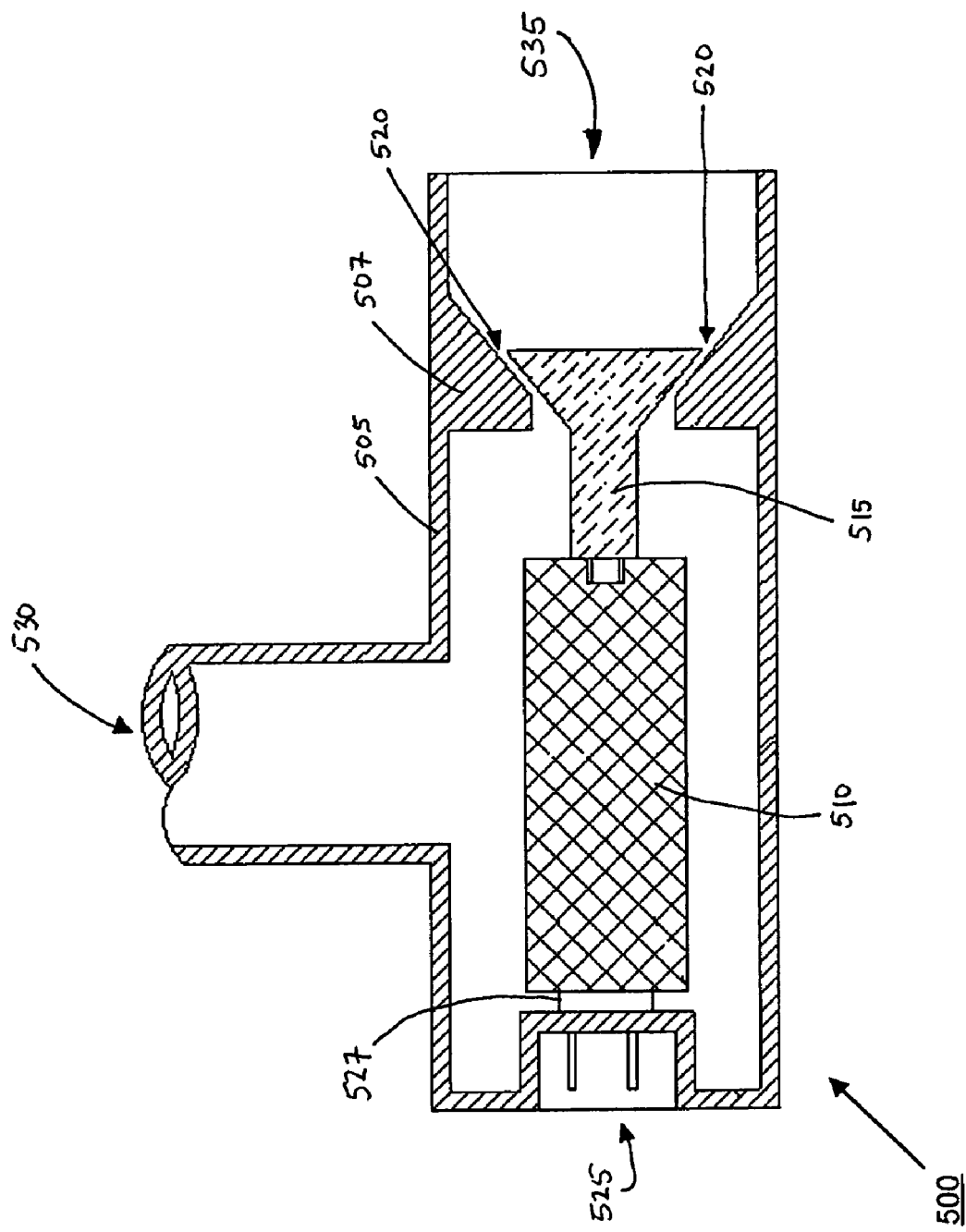
FIG. 5 illustrates yet another embodiment of an expansion valve that includes a piezo material.
Figure 6:
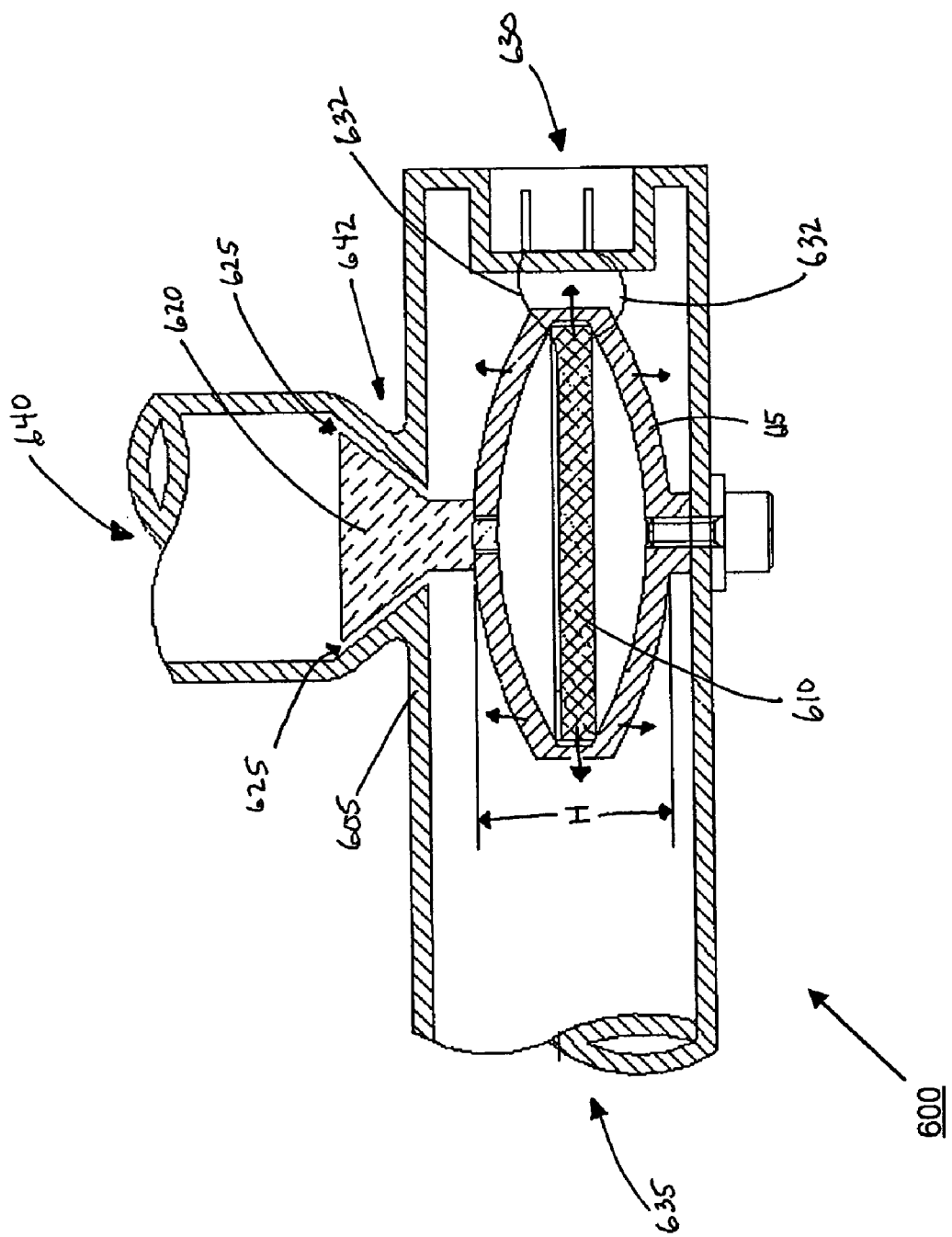
FIG. 6 illustrates still another embodiment of an expansion valve that includes a piezo material.

After the cooling decision has been made (step 315), an appropriate voltage can be applied to the piezo material 205 (step 320). In some embodiments, as previously described, the voltage is delivered to the piezo material by the controller 117. The amount of voltage that is applied to the piezo material 205 has a direct impact on the amount of refrigerant that is allowed to flow through the expansion valve 200. The resulting change in pressure creates a change in temperature (event 325). The piezo material 205 may directly affect the flow of refrigerant through an expansion valve, as shown in FIGS. 4 and 5. Alternatively, the piezo material 205 may deform a displacement amplifier (as shown in FIG. 6), which ultimately controls the flow of refrigerant through the expansion valve 200. In other embodiments, more or fewer steps and events than those shown in FIG. 3 can be used to control the temperature of the refrigeration system 100.

FIG. 4 illustrates an embodiment of an expansion valve 400. The cross sectional view shows an expansion valve body 405, a piezo material 410, a controlled gap 415, and electrical connections 420. Refrigerant 120 flows from an entry portion 425 to an exit portion 430 by flowing around the piezo material 410 and through the controlled gap 415.

The controlled gap 415 is maintained between the expansion valve body 405 and the piezo material 410, and controls the amount of refrigerant 120 that is allowed to flow from the entry portion 425 to the exit portion 430. A relatively wider controlled gap 415 allows more refrigerant to pass through the expansion valve 400 than a relatively smaller controlled gap 415. The controlled gap 415 is altered by controlling the voltage that is applied to the piezo material 410. In the embodiment shown in FIG. 4, the piezo material 410 deforms radially as voltage is applied, thereby creating a relatively smaller controlled gap 415. Therefore, applying voltage to the piezo material 410 with the electrical connectors 420 creates a flow restriction on the refrigerant 120. In some embodiments, the piezo material 410 can be free-floating in the expansion valve 400. In other embodiments, the piezo material 410 is coupled to the expansion valve body 405 with springs (not shown), which still allows the piezo material 410 to deform. Alternatively or additionally, the piezo material 410 can be coupled to the expansion valve body 405 using other mechanisms, such as screws.

FIG. 5 illustrates another embodiment of an expansion valve 500. The expansion valve 500 includes an expansion valve body 505 having protrusions 507, a piezo material 510, a conical seat 515, a controlled gap 520, and electrical connections 525 having wires 527. Similar to FIG. 4, refrigerant flows from an entry portion 530 to an exit portion 535 by flowing through the controlled gap 520.

The piezo material 510 can be configured having various lengths, widths, and volumes, depending on the size and configuration of the expansion valve 500. As previously described, the piezo material 510 expands or contracts (i.e., deforms) according to the potential difference (i.e., voltage) that is applied by the wires 527 of the electrical connections 525. The electrical connections 525 may be connected to a controller (not shown) that is capable of supplying the voltage required to deform the piezo material 510. The configuration of the piezo material can affect the amount of voltage required. The conical seat 515 is coupled to the piezo material 510, and directly affects the amount of refrigerant 120 that passes through the expansion valve 500. The conical seat 515 may be formed of a metal (e.g., stainless steel), or similar material, which has the ability to effectively seal the condenser 530 from the evaporator 535. In some embodiments, when no voltage is applied to the piezo material 510 with the wires 527, the conical seat 515 contacts the inward protrusions 507, sealing the condenser 530 from the evaporator 535. Therefore, when no voltage is applied to the electrical connections 525, refrigerant is not allowed to flow through the expansion valve 500. Conversely, applying a voltage to the electrical connections 525 causes the piezo material 510 to expand, which spaces the conical seat 515 from the protrusions 507. The space that is created between the protrusions 507 and the conical seat 515 increases as the voltage applied to the piezo material increases. Therefore, applying a voltage to the electrical connections 525 effectively controls the cooling effect created by the refrigeration system 100.

The electrical connections 525 may have a standard plug style connection, allowing the electrical connections 525 of the expansion valve 500 to be disconnected from the source (e.g., the controller 117) without the use of mechanical tools. Such a configuration may increase the modularity of the expansion valve 500, allowing it to replace similar expansion valves (e.g., TXV, EXV, etc.) more easily. Such a replacement may occur, for example, if an existing refrigeration system is upgraded to include the expansion valve 500. Additionally, in some embodiments, the entry portion 530 and exit portion 535 are constructed having ends (not shown) that can be readily coupled to refrigerant lines of a condenser or evaporator of an existing refrigeration system, which also increases the modularity of the expansion valve 500. Accordingly, the expansion valve 500 can be retrofitted to an existing system by coupling the entry portion 530 and exit portion 535 to the respective refrigerant lines of the condenser and the evaporator, and connecting the electrical connections 525 to a suitable power source. In some embodiments, retrofitting an existing expansion valve with the expansion valve 500 may also require additional components to be added to the refrigeration system, such as the controller 117.

The components of the expansion valve 500 can be coupled or connected in various ways. For example, the piezo material 510 can be coupled to the expansion valve body 505 using a plurality of mechanisms, such as springs, as previously described. Alternatively, the rigidity of the wires 527 can support the piezo material 510. The conical seat 515 can be coupled to the piezo material 510 using a variety of fasteners, such as screws, rivets, nails, brads, clips, cohesive bonds, springs, and combinations thereof. In other embodiments, the conical seat 515 may be in direct contact with the piezo material 510 without the use of fasteners.

FIG. 6 illustrates another embodiment of an expansion valve 600. The expansion valve 600 includes an expansion valve body 605, a piezo material 610, a displacement amplifier 615, a conical seat 620, a controlled gap 625, electrical connections 630 having wires 632, an entry portion 635, and an exit portion 640. In some embodiments, the exit portion 640 includes a neck portion 642, which has a generally smaller cross sectional area than the rest of the exit portion 640.

The displacement amplifier 615 surrounds the piezo material 610, and is coupled to the conical seat 620. Similar to the expansion valve 500 (FIG. 5), the controlled gap 625 is maintained between the neck portion 642 of the expansion valve 600 and the conical seat 620. Applying a voltage to the piezo material 610 makes it deform. Therefore, the displacement amplifier 615 also deforms. In some embodiments, when a voltage is applied to the piezo material 610, it expands relatively longitudinally (i.e., along the axis of its length). This expansion of the piezo material 610 causes the height H of the displacement amplifier 615 to decrease. As the height H decreases, the conical seat 620 moves closer to the neck portion 642 of the expansion valve 600, thereby allowing less refrigerant to flow from the entry portion 635 to the exit portion 640. As previously described, the volume of refrigerant that flows through the expansion valve 600 has a direct impact on the amount of cooling that occurs. When voltage is removed from the piezo material 610, the piezo material 610 contracts longitudinally, causing the height H of the displacement amplifier 615 to increase, thereby allowing more refrigerant 120 to flow through the expansion valve 600. Therefore, in some embodiments, when voltage is applied to the piezo material 610, more refrigerant is allowed to flow through the expansion valve 600, and cooling occurs.

In some embodiments, the displacement amplifier 615 is a metallic actuator that elastically deforms with the piezo material 610. However, the type, size, and configuration of the displacement amplifier 615 can vary according to the configuration and requirements of the refrigeration system.

Figure 7:
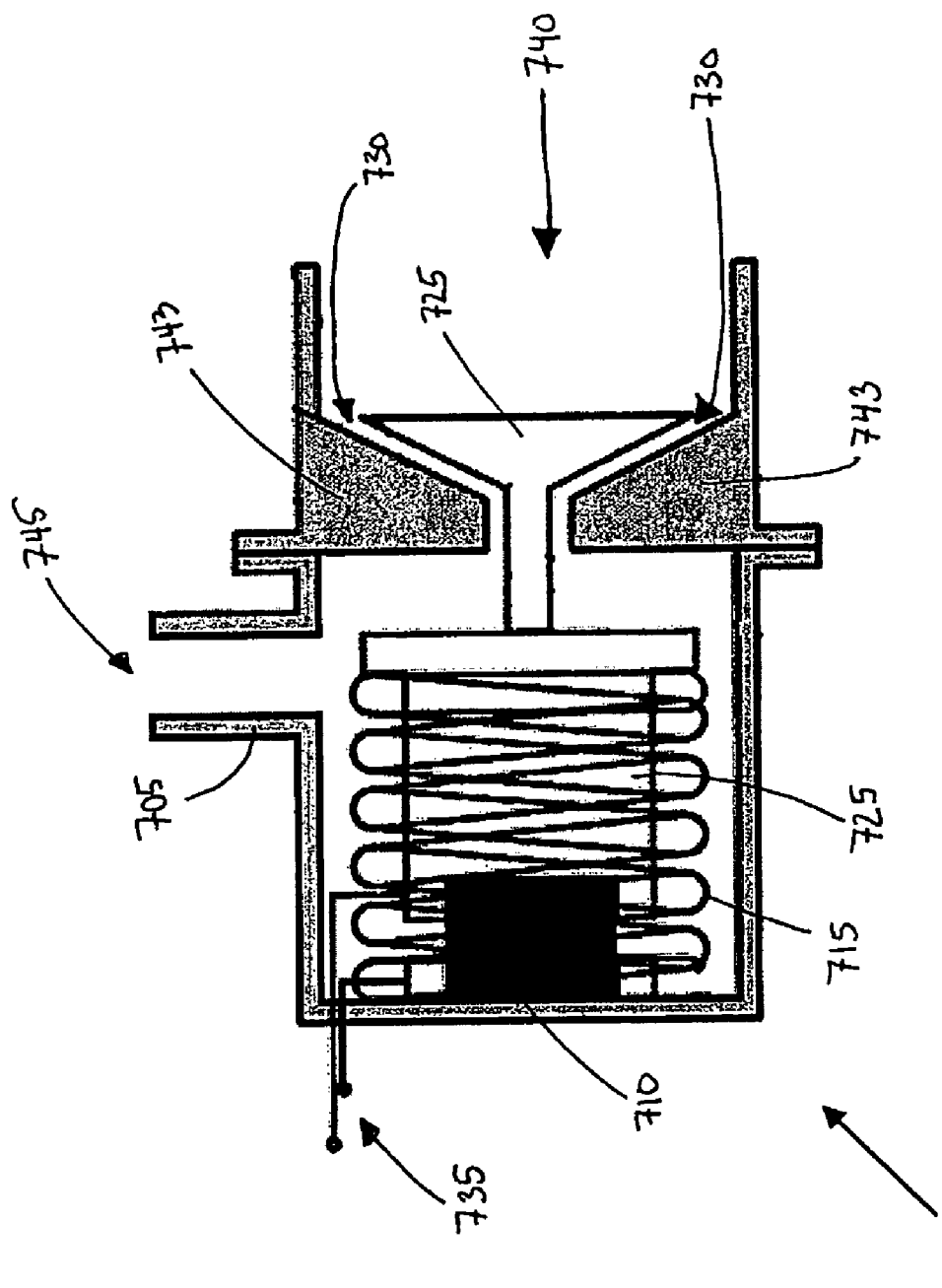
FIG. 7 illustrates still another embodiment of an expansion valve that includes a piezo material.

FIG. 7 illustrates another embodiment of an expansion valve 700. The expansion valve 700 includes an expansion valve body 705, a piezo material 710, a spring 715, a conical seat 725, a controlled gap 730, electrical connections 735, an entry portion 740 having two inward protrusions 743, and an exit portion 745.

The spring 715 is coupled to the expansion valve body 705 and the conical seat 725. The piezo material 710 is also coupled to the expansion valve body 705 and the conical seat 725. Therefore, in some embodiments, the piezo material 710 and the spring 715 cooperatively control the position of the conical seat 725. For example, as previously described, applying a voltage to the piezo material 710 with the electrical connections 735 can cause the piezo material 710 to deform, which alters the position of the conical seat 725. The spring 715 can aid in supporting the movement of the conical seat 725. The spring 715 can also help to reduce stress that is placed on the piezo material 710, for example, stress from pressure exerted on the conical seat 725 by refrigerant 120.

Similar to the displacement amplifier 615 described with respect to FIG. 6, the conical seat 725 controls the amount of refrigerant 120 that is allowed to pass from the entry portion 740 to the exit portion 745 by controlling the controlled gap 730. As previously described, the controlled gap 730 is maintained between the conical seat 725 and the inward protrusions 743. In one embodiment, applying voltage to the piezo material 710 causes the conical seat 725 to increase the controlled gap 730 and allow more refrigerant to pass from the entry portion 740 to the exit portion 745, which produces a cooling effect. Alternatively, if no voltage is applied to the piezo material 710, refrigerant 120 is not allowed to flow through the expansion valve 700, and no cooling effect is produced.

The expansion valves 400, 500, and 600 (shown in FIGS. 4-7) are provided as example implementations only, and do not limit the scope of the present invention. For example, the expansion valves 400, 500, 600, and 700 can be configured differently, with entry portions and exit portions that have alternative arrangements with respect to each other. Piezo materials may be implemented in different positions, or with different sizes and shapes. Furthermore, the shape and configuration of the expansion valve may be altered in accordance with the requirements of the refrigeration system.

Various features and advantages of the invention are set forth in the following claims.

The invention claimed is:

1. A method of controlling flow of a liquid in a refrigeration system, the method comprising:
    maintaining the liquid at a first pressure in a first zone of the refrigeration system;
    maintaining the liquid at a second pressure in a second zone of the refrigeration system, wherein the second pressure is relatively lower than the first pressure; and
    regulating, by applying a voltage to a piezo material, a flow of the liquid from the first zone to the second zone to control a temperature of an environment that is to be cooled by the refrigeration system, wherein the voltage applied to the piezo material is regulated based at least in part on a rate at which the temperature of the environment is to be changed.

2. The method of claim 1, wherein applying the voltage causes a change in a rate of flow of the liquid from the first zone to the second zone.

3. The method of claim 1, wherein applying the voltage to the piezo material causes a displacement amplifier to deform.

* * * * *